United States Patent [19]

Talbot

[11] Patent Number: 4,623,066
[45] Date of Patent: Nov. 18, 1986

[54] COLLAPSIBLE SUPPORT FRAME FOR PLANT CULTURE TRAYS

[76] Inventor: Normand Talbot, 732, 5iéme avenue ouest, Amos, Quebec, Canada, J9T 1P6

[21] Appl. No.: 694,812
[22] Filed: Jan. 25, 1985
[51] Int. Cl.⁴ .............................................. A47F 43/00
[52] U.S. Cl. .................... 211/195; 211/126; 248/439
[58] Field of Search ...................... 211/195, 132, 59.2, 211/85; 248/439

[56] References Cited

U.S. PATENT DOCUMENTS

| 267,928 | 11/1882 | Pinckney | 248/439 |
|---|---|---|---|
| 1,857,617 | 5/1932 | Berdon | 211/195 |
| 1,876,983 | 9/1932 | Lidseen | 211/132 X |
| 2,730,825 | 1/1956 | Wilds | 211/59.2 X |
| 3,189,187 | 6/1965 | Guyer, Jr. et al. | 211/126 X |
| 4,308,964 | 1/1982 | Keller | 211/126 |

Primary Examiner—J. Franklin Foss
Assistant Examiner—Sarah A. Lechok Eley

[57] ABSTRACT

A collapsible support structure for supporting and transporting a plurality of plant culture trays. The structure comprises a rectangular frame having at least two spaced parallel support tracks for receiving end portions of culture trays therebetween. Each track has an outer wall and are secured at their ends to opposed end walls. A retractable leg assembly is secured on adjacent ends of the frame and pivotally connected thereto and displaceable from the underside thereof whereby the leg assembly may be displaced from a support position wherein the frame is supported elevated from a ground surface by the leg assembly to a collapsed position wherein the leg assembly is located entirely within the frame. A retention slot releasably retains the leg assembly within the frame.

10 Claims, 9 Drawing Figures

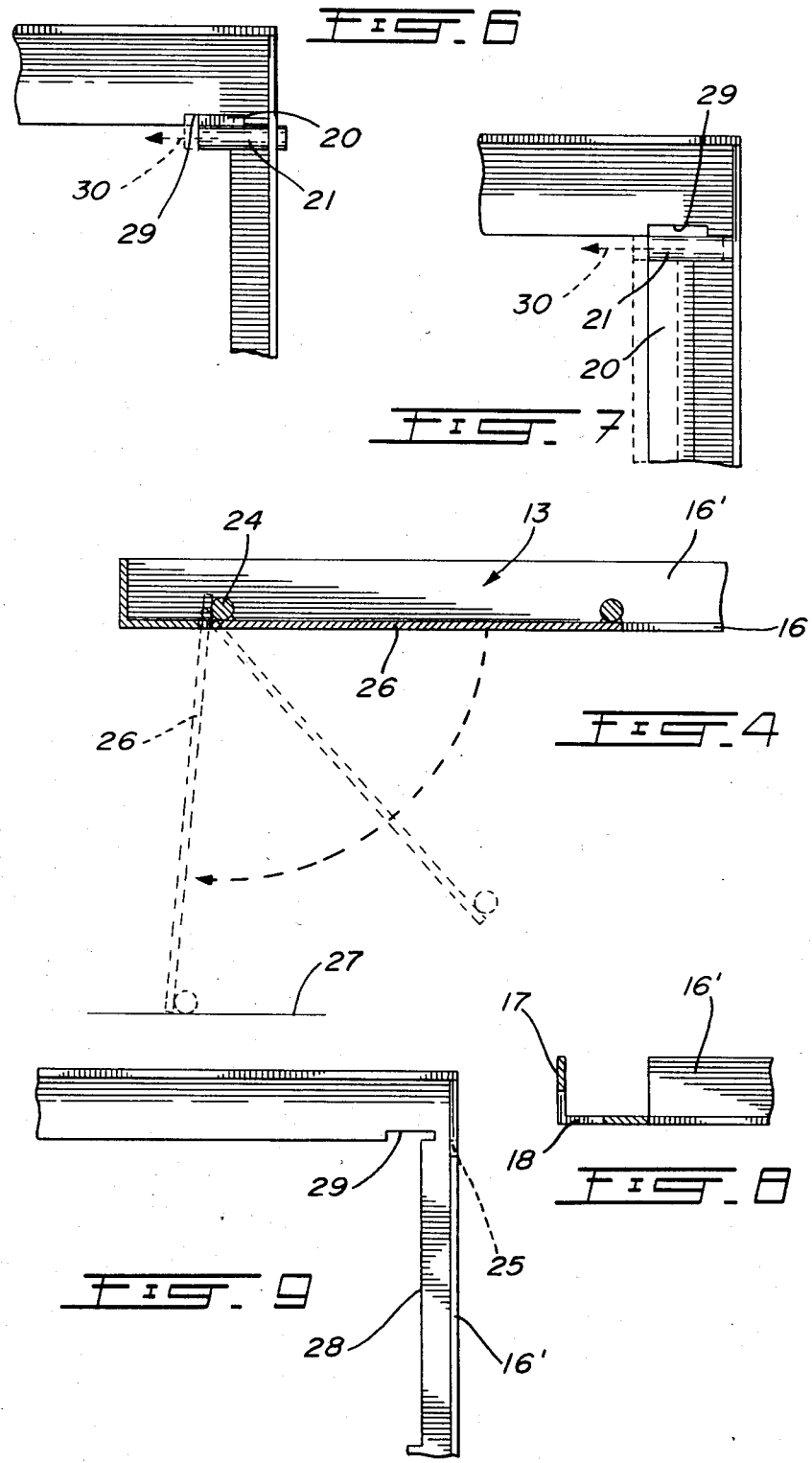

COLLAPSIBLE SUPPORT FRAME FOR PLANT CULTURE TRAYS

BACKGROUND OF INVENTION (a) Field of the Invention

The present invention relates to a collapsible support structure for supporting and transporting a plurality of plant culture trays.

(b) Description of Prior Art

Seedlings are usually grown in culture trays which are usually molded from a plastics material and comprise a plurality of open-end cylinders in which is placed a peat-like earth to receive a seed. These trays are then disposed in greenhouses where the small plant is exposed to humidity, heat and light, either natural or artificial. Within a few months the seed grows into a small tree or seedling ready to be transported and planted.

It is known to manipulate these culture trays by placing a plurality of these on a frame whereby to carry or transport a plurality of trays between two people. However, these support frames are awkward to manoeuver and take much space in a greenhouse when positioned on the ground. Still further, when the plant starts growing the roots will extend out of the bottom openings of the cylinders in the culture trays and start growing into the ground surface as these trays are not supported above ground. Accordingly, when the culture trays are picked up from the ground, often the bottom portion of the roots are broken off as they have been growing into the ground surface on which the trays were disposed. After the seedlings are taken out of the greenhouse, they are placed in the fresh air for climatizing and during this period it is preferable to mount the culture trays or support frames on blocks to keep them elevated from the ground surface. The placing of blocks under the trays and positioning the trays as close as possible in a side-by-side relationship is a very time consuming operation and those cylinders in the culture trays which are lying on the blocks have their bottom cavity blocked. Accordingly the seedlings in those cylinders will not grow in the same proportion as the other seedlings and often will rot as moisture will be trapped inside the cylinder and cause rotting of the roots of the seedlings.

SUMMARY OF INVENTION

It is a feature of the present invention to provide a collapsible support structure for supporting and transporting a plurality of plant culture trays and which substantially overcomes all of the above-mentioned disadvantages of the prior art.

Another feature of the present invention is to provide a collapsible support structure for supporting and transporting a plurality of plant culture trays and wherein the structure comprises a rectangular frame having a retractable leg assembly secured thereto and wherein the leg assembly, when in a collapsed position, lies entirely within the rectangular frame.

According to the above features, from a broad aspect, the present invention provides a collapsible support structure for supporting and transporting a plurality of plant culture trays. The structure comprises a rectangular frame having at least two spaced parallel support tracks for receiving end portions of culture trays therebetween. Each track has an outer wall means. The tracks are secured at their ends to opposed end wall means. A retractable leg assembly is secured on adjacent ends of the frame and pivotally connected thereto and displaceable from the underside thereof whereby the leg assembly may be displaced from the support position wherein the frame is supported elevated from the ground surface by the leg assembly to a collapsed position wherein said leg assembly is located entirely within the frame inwardly of the outer wall means of the tracks. Retention means is further provided to releasably retain the leg assembly within the frame.

BRIEF DESCRIPTION OF DRAWINGS

A preferred embodiment of the present invention will now be described with reference to the example thereof as illustrated in the accompanying drawings, in which:

FIG. 4 is a fragmented section view showing the operation of the retractable leg assembly;

FIG. 6 is a fragmented top corner view of the rectangular frame showing the leg locking cavity;

FIG. 7 is a fragmented top corner view of the rectangular frame showing the detachable pivot connection of the leg assembly;

FIG. 8 is a fragmented section view of the outer end wall showing the handle means; and FIG. 9 is a fragmented plan view showing a corner portion of the rectangular frame.

DESCRIPTION OF PREFERRED EMBODIMENTS

Figure 1:
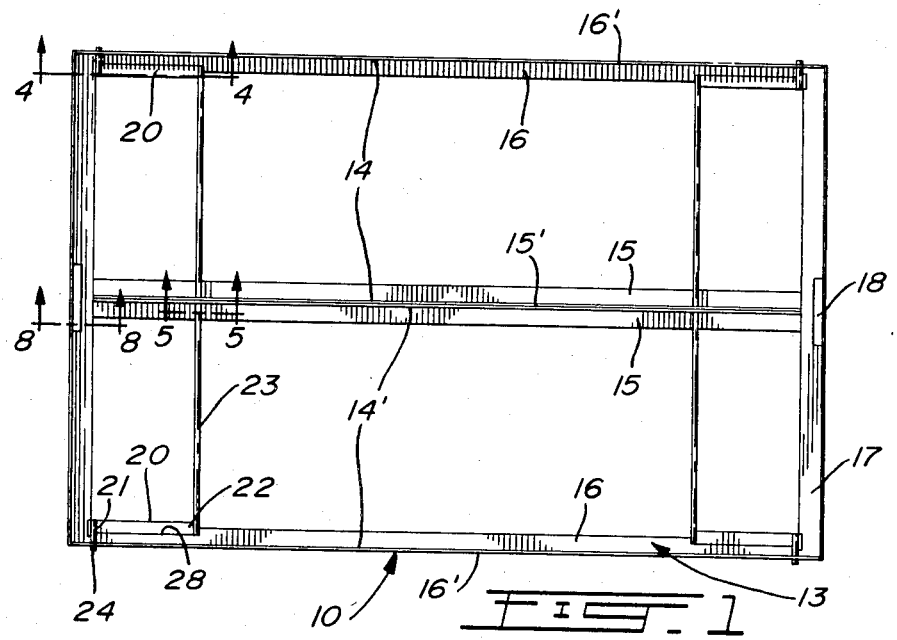
FIG. 1 is a plan view of the collapsible support structure of the present invention.
Figure 2:
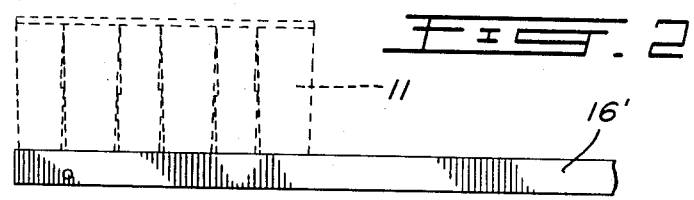
FIG. 2 is a fragmented side view of the collapsible support structure.

Referring now to the drawings and more particularly to FIGS. 1 and 2, there is shown generally at 10 the collapsible support structure of the present invention for supporting and transporting a plurality of plant culture trays 11 for growing seedlings or small trees 12. The structure is comprised of a rectangular frame 13 having at least two spaced parallel support tracks, herein two pairs 14 and 14', for receiving end portions of culture trays 11 therebetween. The rectangular frame is constructed of steel angle iron and as herein shown the two pairs of support tracks 14 and 14' comprise a central structural member 15 of inverted T-shape cross-section and two outer side structural members 16 of L-shape cross-section. The outer side structural members and the central members are secured parallel to one another at their free ends by an L-shape end wall 17.

The outer and central support tracks 16 and 15 have a flat horizontal support wall section, all lying in a common plane. The outer side structural members 16 have an outer vertical wall 16' whereas the central structural member 15 has a common vertical wall 15'. The culture trays 11 are retained on the flat support walls of the tracks between these vertical side walls 16' and 15'. In order to transport the frame and the culture trays, a handle hole 18 (see FIG. 8) is provided centrally in the outer wall 17. The handle hole is constituted by a rectangular cut-out portion disposed centrally in the intersection of the flat wall section and the vertical outer wall section of the outer L-shape end wall 17.

Referring now additionally to FIGS. 3 to 7, there is shown the construction of the retractable leg assembly 19. As shown more clearly in FIGS. 1 and 3, the leg assembly comprises a pair of leg members 20 having a connecting pivot end 21 and a free support end 22. A flexible bar 23 is interconnected between the support ends 22. A pivot pin 24 is secured to the pivot end 21 and extends outwardly from the leg members 20 whereby to be received in a pivot hole 25 (see FIG. 9) provided in a respective one of the vertical outer walls 16' of outer ones of the support tracks 14.

Figure 3:
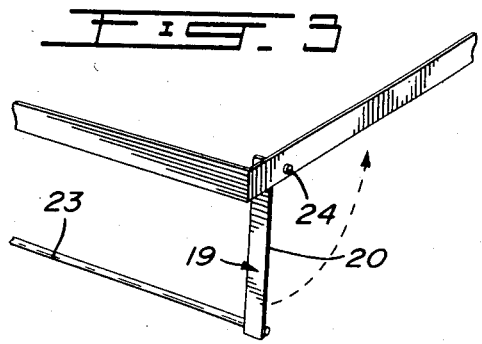
FIG. 3 is a fragmented perspective view showing the leg assembly in its support position.
Figure 5:
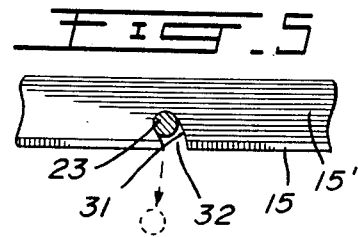
FIG. 5 is a fragmented view showing the securement means of the retractable leg assembly.

As illustrated more clearly in FIGS. 1, 3, and 4, the leg assembly is displaceable on its pivot pins 24 from a support position, as shown in phantom lines at 26 of FIG. 4, wherein the frame 13 is supported elevated from the ground surface 27, for aeration of the plants in the culture trays, to a collapsed position as shown in solid line in FIG. 4. In the collapsible position the entire leg assembly is located entirely within the frame 13 and this is accomplished by providing an elongated leg housing cavity 28 (see FIG. 9) in a portion of the outer ones of the flat support tracks 13 adjacent the ends thereof whereby to receive the leg members 20 in coplanar relationship therewith. The leg members 20 are elongated flat rectangular bars.

Referring now to FIGS. 6 and 9, it can be seen that when the leg assembly is in its support position, the leg member 20 extends through a respective leg locking cavity 29 to prevent accidental removal of the pivot pin 21 from the pivot hole 25 if the leg member 20 is subjected to a movement in the direction of arrow 30. However, when it is necessary to remove or detach the leg assembly 19 from the frame 13, the leg assembly is placed in its collapsed position, as shown in FIG. 7, wherein the leg member 20 no longer lies in the leg locking cavity 29, and by applying a force in the direction of arrow 30, the pivot pin 21 will move out of its pivot hole 25. This is achievable by making the interconnecting bar 23 from flexible material. As herein shown, the bar is a steel rod of small circular diameter capable of bowing whereby to permit the pivoted end of the leg members to be displaced in the direction of arrow 30.

The interconnecting flexible bar 23 also has a further purpose and that is to lock the leg assembly within the frame when the assembly is placed in its collapsed position, as shown in FIG. 1. A leg assembly retention means in the form of a bar receiving slot 31 (see FIG. 5) is disposed in a bottom edge of the central structural member 15, and extends within the vertical wall 15'. The slot has a throat opening 32 through which the bar 23 may enter. The slot slopes angularly towards the pivot end of the assembly and is spaced from the end a distance such that the throat opening is slightly forward of the flexible bar when brought thereagainst whereby the bar must be flexed outwardly to enter the slot, and once entered, the bar is retained captive in the slot whereby to maintain the leg assembly in its collapsed position entirely within the frame.

As shown in FIG. 4, the leg members 20 do not protrude from the flat horizontal support walls 16 and side walls 16'. Accordingly, these frames can be placed in side-by-side relationship on a flat surface without hinderance by the leg assembly or may be mounted in stacked arrays on support frames (not shown) for over-the-road transportation. Still further, by having the leg assembly collapsed within the frame and retained therein, these support structures do not occupy much space when the legs are collapsed within the frame and are easily stored in large quantities into containers for shipping or storage. Still further, when it is necessary to aerate the seedling in the culture trays, the legs support the trays elevated from the ground surface with minimum obstruction to the bottom wall of the culture trays wherein all cylinders of the culture trays are properly ventilated. The trays are thus manipulated with minimum labor and time.

Although the support structure 10 as hereinabove described is constructed entirely from metal parts, it is foreseeable that part of the support structure of the entire support structure may be constructed of structural plastics material or any other suitable material or combination of materials. Still further, the tracks need not be constructed from angle members but could be formed from welded wire members.

It is within the ambit of the present invention to cover any obvious modifications thereof, provided such modifications fall within the scope of the appended claims.

I claim:

1. A collapsible support structure for supporting and transporting a plurality of plant culture trays, said structure comprising a rectangular frame having at least two spaced parallel support tracks for receiving end portions of culture trays therebetween, each track having outer wall means, said tracks being secured at their ends to opposed end wall means, and a retractable leg assembly secured on adjacent ends of said frame and pivotally connected thereto and displaceable from the underside thereof whereby said leg assembly may be displaced from a support position wherein said frame is supported elevated from a ground surface by said leg assembly to a collapsed position wherein said leg assembly is located entirely within said frame, said two pairs of support tracks being constituted by a central structural member of inverted T-shape cross-section and two outerside structural members of L-shape cross-section, each leg assembly being comprised of a pair of leg members having a connecting pivot end and a free support end, a flexible bar interconnected between said support end, a bar receiving slot having a throat opening in a bottom edge of said central structural member and dimensioned to receive a portion of said flexible bar therein, said slot sloping angularly towards said pivot end and being spaced a predetermined distance such that said throat opening is slightly forward of said flexible bar whereby said bar is flexed outwardly to enter said slot and retained captive therein to retain said leg assembly in said collapsed position and entirely within said frame.

2. A collapsible support structure as claimed in claim 1 wherein said frame comprises two pairs of said support tracks positioned side by side.

3. A collapsible support structure as claimed in claim 2 wherein said members are secured relative to one another wherein to provide two pairs of opposed flat support tracks extending in a common plane and having two vertical outer walls and a common central wall associated with said support tracks of said central structural member, said outer walls and central wall constituting said outer wall means.

4. A collapsible support structure as claimed in claim 3 wherein there is further provided handle means in said end wall means.

5. A collapsible support structure as claimed in claim 4 wherein said end wall means is a structural member of L-shape cross-section having a flat wall section extending in the same plane as said common plane, and a vertical outer wall section, said handle means being a rectangular cut-out portion disposed centrally in the intersection of said flat wall section and vertical outer wall section.

6. A collapsible support structure as claimed in claim 3 wherein a pivot pin outwardly extends at said pivot end of said leg members, each pin being received in a pivot hole provided in a respective one of said vertical outer walls of outer ones of said support tracks.

7. A collapsible support structure as claimed in claim 6 wherein there is further provided a leg locking cavity adjacent the ends of said outer ones of said tracks, each said leg member extending through a respective leg locking cavity when said leg assembly is in said support position.

8. A collapsible support structure as claimed in claim 6 wherein there is further provided an elongated leg housing cavity in a portion of said outer ones of said flat support tracks adjacent the ends thereof to receive said leg members therein when said leg assembly is in said collapsed position.

9. A collapsible support structure as claimed in claim 7 or 8 wherein said leg members are elongated flat rectangular leg members.

10. A collapsible support structure as claimed in claim 6 wherein said rectangular frame and said leg assemblies are constructed of metal, said leg assembly being removable from said frame when disposed in its collapsed position wherein each pivot pin can be disengaged from its pivot hole.

* * * * *